US008707248B2

(12) United States Patent
Sawant et al.

(10) Patent No.: US 8,707,248 B2
(45) Date of Patent: Apr. 22, 2014

(54) TRANSFORMATION FRAMEWORK

(75) Inventors: Nitin M. Sawant, Maharashtra (IN); Himanshu Haresh Shah, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 314 days.

(21) Appl. No.: 13/221,957

(22) Filed: Aug. 31, 2011

(65) Prior Publication Data

US 2012/0246611 A1 Sep. 27, 2012

(30) Foreign Application Priority Data

Mar. 26, 2011 (IN) ............................ 952/CHE/2011

(51) Int. Cl.
*G06F 9/44* (2006.01)

(52) U.S. Cl.
USPC .......................................................... 717/104

(58) Field of Classification Search
USPC .......................................................... 717/104
See application file for complete search history.

(56) References Cited

U.S. PATENT DOCUMENTS

| | | | | |
|---|---|---|---|---|
| 2008/0300928 | A1* | 12/2008 | Racca et al. | 705/7 |
| 2012/0030122 | A1* | 2/2012 | Rahaman et al. | 705/301 |
| 2012/0036453 | A1* | 2/2012 | Appel | 715/751 |
| 2012/0053974 | A1* | 3/2012 | Kulkarni et al. | 705/7.12 |
| 2012/0072892 | A1* | 3/2012 | Balko et al. | 717/144 |

* cited by examiner

*Primary Examiner* — Philip Wang
(74) *Attorney, Agent, or Firm* — Fish & Richardson P.C.

(57) ABSTRACT

A transformation framework accesses user story information inputted by a user into a pre-defined template designed to receive a user story and parses the accessed user story information to identify key pieces of the user story. The transformation framework identifies process components needed to implement the software system requirement defined by the user story and generates a process language model for each of the identified process components. The transformation framework maps the key pieces parsed from the user story to the generated process language models to define process language statements that correspond to the software system requirement defined by the user story.

20 Claims, 12 Drawing Sheets

300

| AGILE METHODOLOGY | BPEL |
|---|---|
| User Story | Abstract Process |
| Sub-stories within a user-story | Services/ Business Process |
| High-level Business Case | High-Level Business Requirement |
| Actor-Action-Achievement model | Role-Request-Response model |
| Data-driven and implementation agnostic | Data-driven and implementation agnostic |

FIG. 3

```
                                                            ┌─500
    ┌─502              504
As a <role>,╌╌╌╌╌╌╌╌╌╌╌╌╌╌╌╌╌╌╌╌╌╌╌╌╌╌╌╌╌╌╌╌╌╌╌╌╌╌╌╌╌╌╌╌╌╌╌
I want to <Activity1>, <Activity2>......<Activity N-1> and <Activity N>
so that I can <end goal>.
                         └─506
```

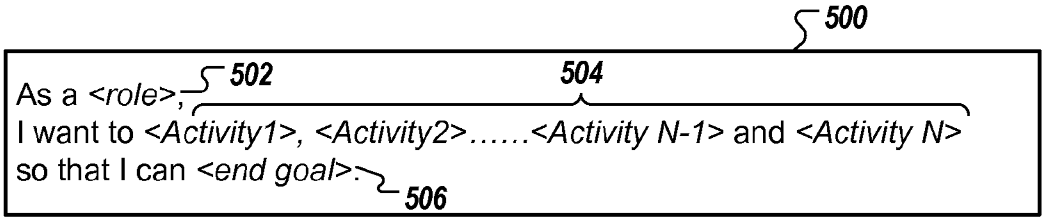

FIG. 5A

```
                                                            ┌─510
    ┌─512              514
As a <role>,
I want to <Activity1>, <Activity2>......<Activity n-1> and <Activity n>,
one after another so that I can <end goal>  └─516
        └─517
```

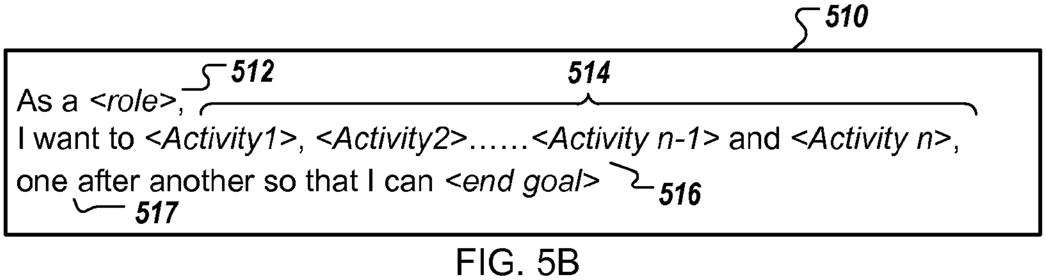

FIG. 5B

```
                                                            ┌─520
                  ┌─522         524
As a <role>,
I want to <Activity1>, <Activity2>, ....<Activity N-1> and <Activity N>
so that I can <end goal>.   ┌─526
Try <M> times.   528    ┌─530
On failure, rollback <all/none>
```

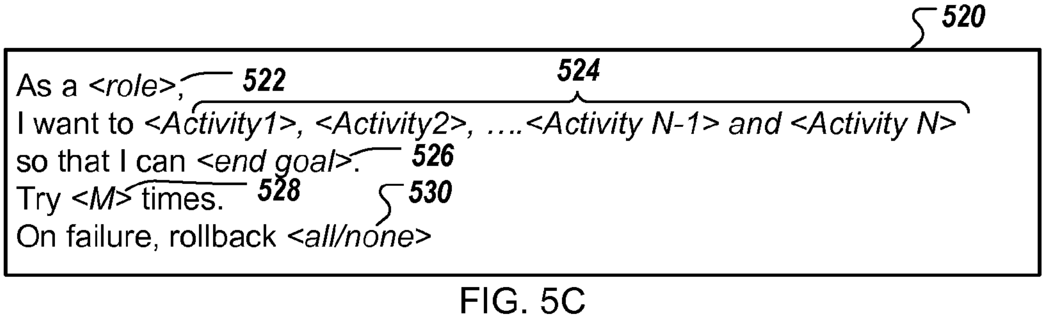

FIG. 5C

```
                                                            ┌─540
As a <role>,
I want to try <M> times
<Activity1>, <Activity2>......<Activity N-1> and <Activity N>
so that I can <end goal>
```

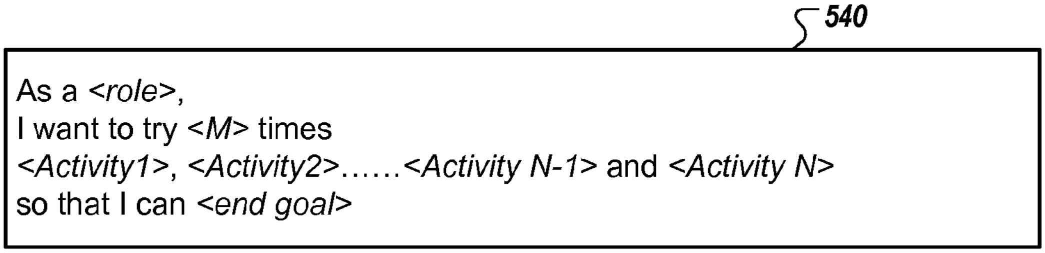

FIG. 5D

```
                                                            ┌─560
As a <role>,  ┌─562   ┌─564
I want to <Activity1>, if <condition1>,  ┌─566
<Activity2>, if <condition2> ......
<Activity N-1>, if <condition N-1> and
<Activity N>, if <condition N>
so that I can <end goal>  ┌─563
```

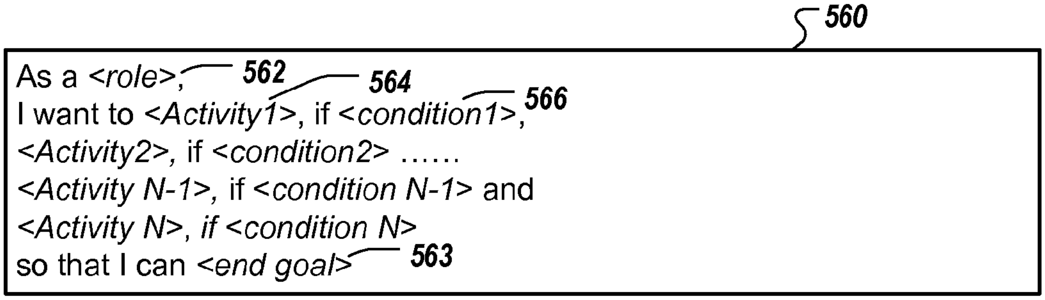

FIG. 5E

```
                    ┌─ 612              ┌─ 614                          800
As a purchaseOrderProcessor, I want to calculate prices,
arrange shipping, schedule production, and create an invoice
  / so that I can confirm orders.  \       \
 /                    \              ─ 616   ─ 617
 ─ 615                 ─ 619
```

```
<process name="purchaseOrderProcessorProcess"  ─ 808                     802

    targetNamespace="http://example.com/ws-bp/purchase"

    xmlns="http://docs.oasis-open.org/wsbpel/2.0/process/executable"

    xmlns:lns="http://manufacturing.org/wsdl/purchase"> ─ 810
```

```
<partnerLinks> ─ 824                                                      804
822 ─┐                    ┌─ 818              ┌─ 820
    <partnerlink myRole="calculatePriceProcessRole" name="calculatePriceService">
830 ─┐                                                 ┌─ 828
    <partnerlink myRole="arrangeShippingProcessRole" name="arrangeShippingService">
836 ─┐              826 ─┘
    <partnerlink myRole="scheduleProductionProcessRole" name="scheduleProductionService">
842 ─┐              832 ─┘                                            \
    <partnerlink myRole="createInvoiceProcessRole" name="createInvoiceService">
                                                                       ─ 834
</partnerlinks>                   ─ 838                   ─ 840
```

```
                                                                         806
                     ┌─ 812
<receive partnerLink="purchaseOrderPartner" portType="lns:purchasePT"

    operation="confirmOrderProcessorOperation" variable="PO"
                                                          ─ 816
    createInstance="yes"> ─ 814

</receive>
```

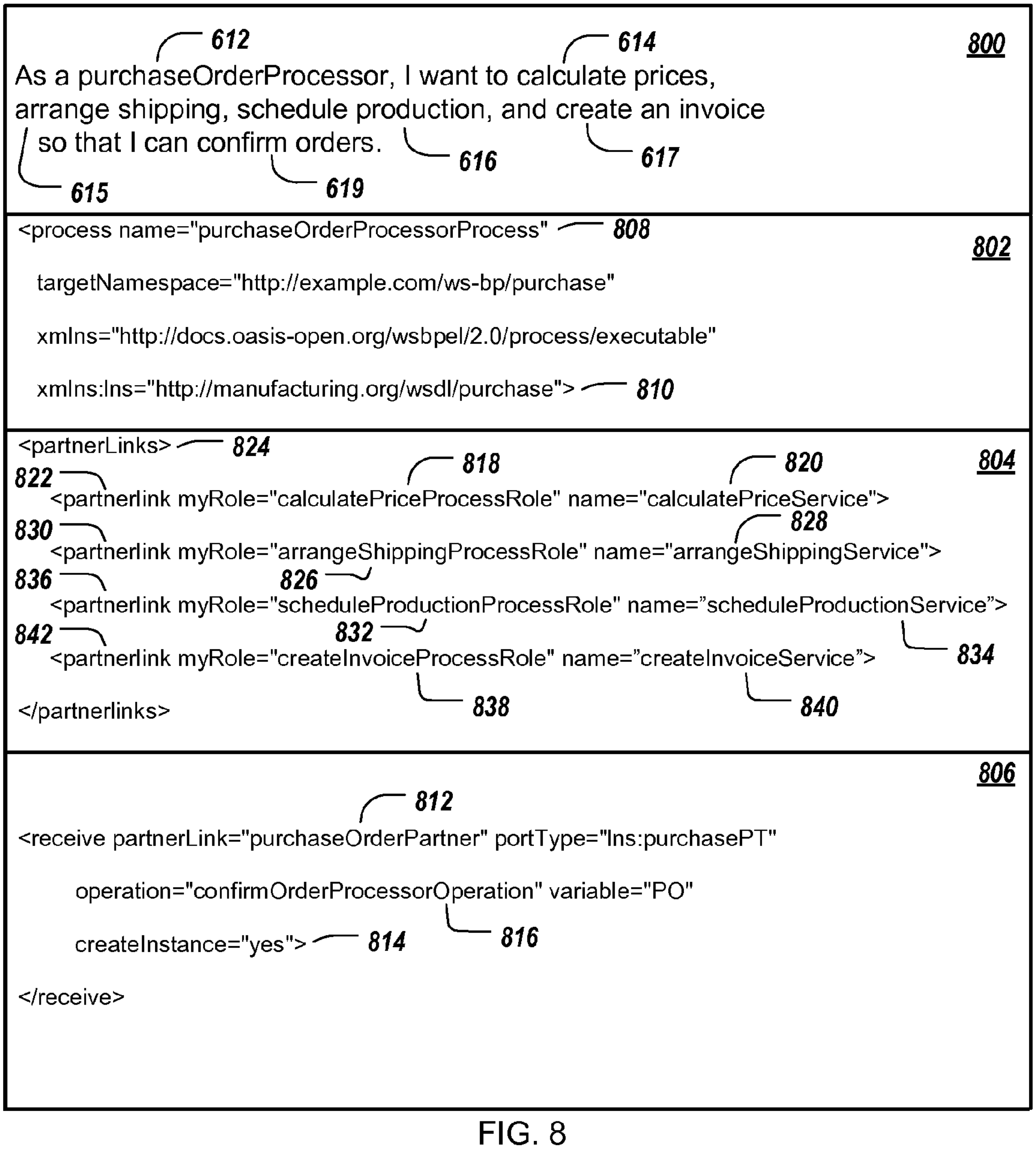

FIG. 8

| | | |
|---|---|---|
| As a traveler, (916)<br>I want to make a flight reservation, (918) hotel reservation (920) and car reservation (922)<br>so that I can confirm my holiday vacation. (924)<br>Try 3 times. (926) On failure, rollback all. (928) | | 900 |
| process | <process name="travelerProcess" (930)<br>targetNamespace="http://example.com/ws-bp/purchase"<br>xmlns="http://docs.oasis-open.org/wsbpel/2.0/process/executable"<br>xmlns:lns="http://manufacturing.org/wsdl/purchase"> (932) | 902 |
| partnerlink | <partnerLinks> (938)<br>(936) <partnerlink name="makeFlightReservationService" (934) myRole="makeFlightReservationProcessRole"> (935)<br>(942) <partnerlink name="hotelReservationService" (940) myRole="hotelReservationProcessRole"> (941)<br>(946) <partnerlink name="carReservationService" (944) myRole="carReservationProcessRole"> (945)<br><partnerLinks><br>...<br><sequence><br>... | 904 |
| invoke | <invoke (950) partnerLink="makeFlightReservationPL" (960) portType="makeFlightReservationPT" (962)<br>operation="invokemakeFlightReservation" (964)<br>inputVariable="makeFlightReservationInputVariable" (966)<br>outputVariable="makeFlightReservationOutputVariable"> (968)<br><documentation>Decide On makeFlightReservation</documentation> (970)<br><catch faultName="QName"? (978)<br>faultVariable="makeFlightReservationInputVariable" (976)<br>faultMessageType="QName"<br>faultElement="QName"><br>activity<br></catch><br></invoke> | 906 |

FIG. 9A

| | |
|---|---|
| receive | **908**<br><receive partnerLink="makeFlightReservationPL"<br>952<br>portType="makeFlightReservationPT"<br>972<br>operation="receivemakeFlightReservation"<br>974<br>createInstance="yes"><br><br></receive> |
| throw | **910**<br><throw faultName="QName"<br>954<br>faultVariable="makeFlightReservationInputVariable"<br>980<br></throw> |
| variable | **912**<br><variables><br>956<br><variable name="makeFlightReservationInputVariable"<br>982<br>messageType="QName"<br>type="QName"<br>element="QName"?><br>from-spec<br></variable><br><variable name="trialVariable"<br>messageType="QName"<br>type="QName"<br>element="QName"?><br>from-spec<br></variable><br></variables> |
| while | **914**<br><while><br>994<br><condition><$trial > 3</condition><br>992 990<br><scope>...</scope><br><br></while> |

FIG. 9B

TRANSFORMATION FRAMEWORK

CROSS-REFERENCE TO RELATED APPLICATION

The present application claims the benefit of Indian Patent Application No. 952/CHE/2011, filed on Mar. 26, 2011, which is incorporated herein by reference in its entirety for all purposes.

FIELD

This disclosure relates to transformation technology and, more particularly, to transformation of user stories to a process model language.

BACKGROUND

A business process management project may involve creation of process flows that leverage and/or create services based on initial requirements. The process flow creation may involve process modeling using a modeling tool and feeding the model to a process server in the form of process language statements. The process language statements may expose the process as a service.

SUMMARY

In one aspect, a system includes at least one processor and at least one memory coupled to the at least one processor having stored thereon instructions which, when executed by the at least one processor, causes the at least one processor to perform operations. The operations include accessing user story information that was inputted by a user into a pre-defined template designed to receive a user story. The user story is a software system requirement formulated as one or more sentences in an everyday or business language of the user. The operations also include parsing the accessed user story information inputted by the user into the pre-defined template to identify key pieces of the user story and, based on the key pieces of the user story parsed from the user story information inputted by the user into the pre-defined template, identifying process components needed to implement the software system requirement defined by the user story. The operations further include generating a process language model for each of the identified process components, mapping the key pieces parsed from the user story to the generated process language models to define process language statements that correspond to the software system requirement defined by the user story, and outputting the process language statements.

Implementations may include one or more of the following features. For example, the operations may include accessing agile user story information that was inputted by a user into a pre-defined template designed to receive an agile user story and parsing the accessed agile user story information inputted by the user into the pre-defined template to identify key pieces of the agile user story. In this example, the operations may include identifying process components needed to implement the software system requirement defined by the agile user story and mapping the key pieces parsed from the agile user story to the generated process language models to define process language statements that correspond to the software system requirement defined by the agile user story.

In some implementations, the operations may include identifying business process components needed to implement the software system requirement defined by the user story and generating a business process language model for each of the identified business process components. In these implementations, the operations may include mapping the key pieces parsed from the user story to the generated business process language models to define business process language statements that correspond to the software system requirement defined by the user story and outputting the business process language statements.

In some examples, the operations may include identifying business process execution language (BPEL) components needed to implement the software system requirement defined by the user story and generating a BPEL model for each of the identified BPEL components. In these examples, the operations may include mapping the key pieces parsed from the user story to the generated BPEL models to define BPEL statements that correspond to the software system requirement defined by the user story and outputting the BPEL statements.

The operations may include identifying business process modeling notation (BPMN) components needed to implement the software system requirement defined by the user story and generating a BPMN model for each of the identified BPMN components. The operations also may include mapping the key pieces parsed from the user story to the generated BPMN models to define BPMN statements that correspond to the software system requirement defined by the user story and outputting the BPMN statements. The operations further may include defining business process language statements that are in a business process management compliant format.

In some implementations, the operations may include accessing user story information that was inputted by a user into a pre-defined template that includes a first input area designed to receive a role and a second input area designed to receive one or more activities and parsing the accessed user story information inputted by the user into the pre-defined template to identify the role and the one or more activities. In these implementations, the operations may include identifying a process needed to implement the software system requirement defined by the user story, generating a process language model for the identified process, and mapping the role parsed from the user story to the generated process language model for the identified process.

Further, the operations may include identifying one or more partnerlinks needed to implement the software system requirement defined by the user story, generating a process language model for the identified one or more partnerlinks, and mapping the one or more activities parsed from the user story to the generated process language model for the identified one or more partnerlinks. Also, the operations may include identifying a receive process component needed to implement the software system requirement defined by the user story, and generating a process language model for the identified receive process component. In addition, the operations may include accessing user story information that was inputted by a user into a pre-defined template that includes a third input area designed to receive a number of attempts and a fourth input area designed to receive a failure handling action and parsing the accessed user story information inputted by the user into the pre-defined template to identify the number of attempts and the failure handling action.

The operations may include identifying an invoke process component needed to implement the software system requirement defined by the user story, generating a process language model for the identified invoke process component, and mapping the one or more activities parsed from the user story to the generated process language model for the identified invoke process component. The operations also may include identifying a throw process component needed to implement the software system requirement defined by the user story, generating a process language model for the identified throw process component, and mapping the one or more activities parsed from the user story to the generated process language model for the identified throw process component. The operations further may include identifying variables needed to implement the software system requirement defined by the user story, generating a process language model for the identified variables, and mapping the one or more activities parsed from the user story to the generated process language model for the identified variables. In addition, the operations may include identifying a loop process component needed to implement the software system requirement defined by the user story, generating a process language model for the identified loop process component, and mapping the number of attempts parsed from the user story to the generated process language model for the identified loop process component.

In some examples, the operations may include automatically, without human intervention, generating test cases for the process language statements, running the automatically generated test cases against the process language statements, tracking results of running the automatically generated test cases against the process language statements, and providing output based on the tracked results. In these examples, the operations may include generating an error report based on the tracked results and outputting the generated error report. Further, in these examples, the operations may include determining one or more suggested changes to the process language statements based on the tracked results and outputting the one or more suggested changes.

In another aspect, a method includes accessing user story information that was inputted by a user into a pre-defined template designed to receive a user story. The user story is a software system requirement formulated as one or more sentences in an everyday or business language of the user. The method also includes parsing the accessed user story information inputted by the user into the pre-defined template to identify key pieces of the user story and, based on the key pieces of the user story parsed from the user story information inputted by the user into the pre-defined template, identifying process components needed to implement the software system requirement defined by the user story. The method further includes generating a process language model for each of the identified process components, mapping, by at least one processor, the key pieces parsed from the user story to the generated process language models to define process language statements that correspond to the software system requirement defined by the user story, and outputting the process language statements.

In yet another aspect, at least one computer-readable storage medium encoded with executable instructions that, when executed by at least one processor, cause the at least one processor to perform operations. The operations include accessing user story information that was inputted by a user into a pre-defined template designed to receive a user story. The user story is a software system requirement formulated as one or more sentences in an everyday or business language of the user. The operations also include parsing the accessed user story information inputted by the user into the pre-defined template to identify key pieces of the user story and, based on the key pieces of the user story parsed from the user story information inputted by the user into the pre-defined template, identifying process components needed to implement the software system requirement defined by the user story. The operations further include generating a process language model for each of the identified process components, mapping the key pieces parsed from the user story to the generated process language models to define process language statements that correspond to the software system requirement defined by the user story, and outputting the process language statements.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 3 is a table which illustrates mappings between an agile methodology and the business process execution language.

FIGS. 5A-5E are diagrams illustrating exemplary templates for user story information.

FIGS. 7, 8, 9A, and 9B are diagrams illustrating transformation of user story information to process language statements.

Like reference numbers represent corresponding parts throughout.

DETAILED DESCRIPTION

A transformation framework may improve business process management (BPM) projects implemented using AGILE methodologies for capturing requirements. Business process designers often spend a lot of effort converting user stories into business processes. The transformation framework provides automation to not only expedite the analysis to design transition, but also provide inputs to business process modeling products for quick implementation, which may result in higher productivity, cost savings and better quality output. The transformation framework may help to directly convert AGILE requirements (user stories) to BPM compliant format (e.g., XML-based BPEL (Business Process Execution Language) or BPMN (Business Process Modeling Notation)), which may reduce development effort considerably.

In some implementations, the transformation framework receives user stories (in plain English) as inputs and automatically transforms the user stories into corresponding equivalents in a business process language (e.g., BPEL, BPMN, etc.). The output can then be deployed on process engines. In this regard, the transformation framework reads AGILE stories, based on a pre-defined template with placeholders, using a regular expressions (regex) parser. The values in the placeholders are then embedded in a pre-defined BPEL WSDL (Web Services Description Language) file, which may be deployed on a BPEL process engine.

The techniques described throughout this disclosure may assist business analysts and BPM designers. Specifically, business analysts can relate to the design which gets derived from their requirements and can actively review and comment on the design output. Also, BPM designers can talk a consistent language with the business analysts as well the developer community.

In addition, in some cases, modeling of BPM process flows may entail usage of expensive modeling tools, and a complex process of converting the models to WSDL and then embedding the models in a process engine. The transformation framework may reduce cost and complexity by directly converting AGILE requirements (user stories) to a BPM compliant format (e.g., XML-based BPEL WSDL). In this regard, the transformation framework and techniques described throughout the disclosure may reduce the usage of a modeler by providing a generic BPEL WSDL that can be customized based on the AGILE story and additional user input. Business analysts may capture requirements in the transformation framework template, which may bring standardization to the nomenclature. BPM designers may avoid training on complicated BPM designer products, which may reduce time as well as cost. Developers and architects may use the WSDL directly for implementation, which may reduce the time spent in interaction with business analysts and BPM designers for clarifications. The transformation framework templates also may be used as a baseline for creating test cases, which may reduce the time and effort for test analysts as well.

Figure 1:
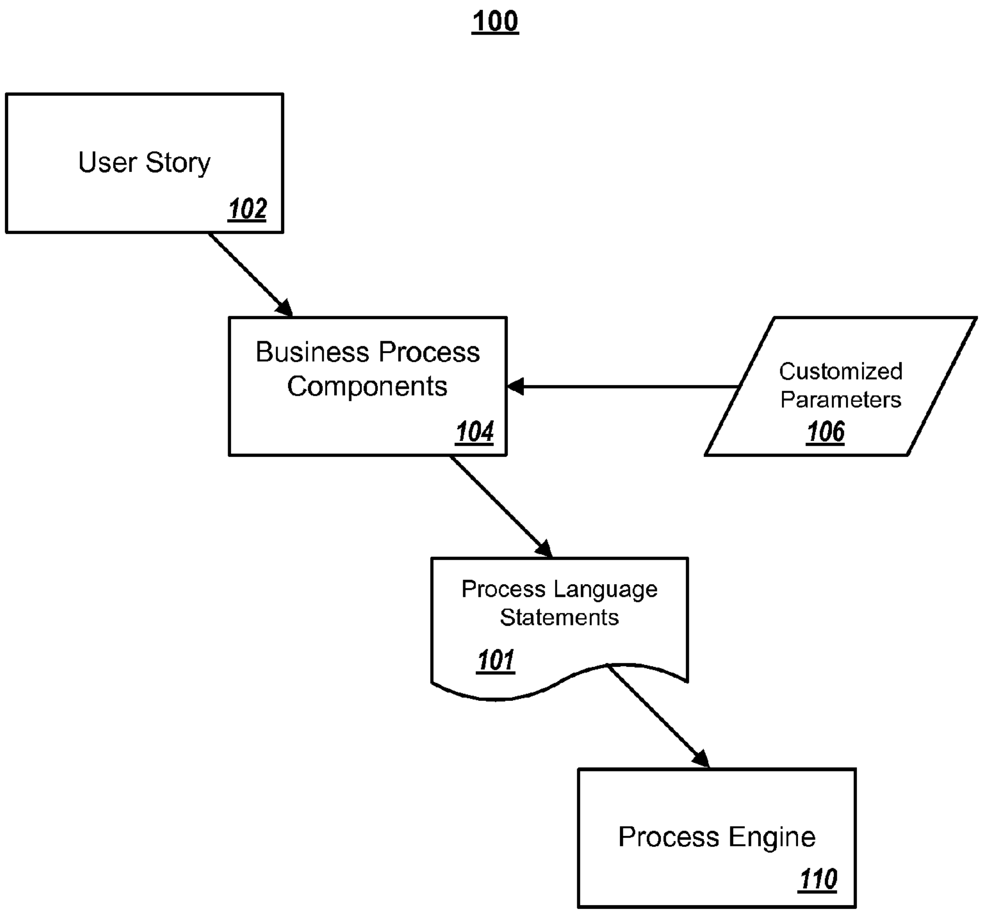
FIGS. 1, 2, and 11 are diagrams of exemplary systems.

FIG. 1 illustrates an exemplary system 100 for defining process language statements 101 that correspond to a software system requirement defined by a user story 102. The user story 102 may be formulated, for example, as one or more sentences in an everyday or business language of the user. The user story 102 may be received, for example, from a user interface, or may be accessed from a file, a database, or from some other storage. In some implementations, the user story 102 is an agile user story generated as part of an agile development process.

The user may be a customer or future end user of the software system and the user story 102 may describe goals and desires of the user, for example, what the user wants to be able to achieve with the software system. The user story 102 may be used by a development team to define features that may be implemented in the software system. The user story 102 may be associated with an acceptance test or procedure. The acceptance test or procedure may allow a developer to test to determine whether a user story has been implemented and may allow the user to verify whether the user story has been implemented correctly. The user story 102 may be assigned a priority in consideration of priorities assigned to other user stories.

As mentioned, the user story 102 may be received as user input. For example, the user may have inputted the user story 102 into a pre-defined template designed to receive user story information. The pre-defined template may include, for example, one or more input areas that serve as placeholders for the user to input particular types of information. For example, the pre-defined template may include a first input area designed to receive a specification of a user role and a second input area designed to receive one or more activities that the user desires to perform with the software system.

The user story 102 is accessed (e.g., from a user input area, from a file or database) and parsed to identify key pieces of the user story. The user story 102 may be parsed, for example, using regular expressions to identify a role and one or more activities specified by the user. One or more business process components 104 may be identified based on the identified key pieces of the user story. The business process components 104 may be identified as needed to implement the software system requirement defined by the user story. The business process components 104 may include, for example, one or more BPEL (Business Process Execution Language) components and/or one or more BPMN (Business Process Modeling Notation) components. In some implementations, one or more customized parameters 106, which may include further user input, may be used to identify the business components 104 and/or customize/supplement the business components 104.

A process language model may be generated for each of the business process components 104. For example, a BPEL model may be generated for each of the identified BPEL components and a BPMN model may be generated for each of the identified BPMN components. The key pieces parsed from the user story 102 may be mapped to the generated process language models to define the process language statements 101, where the process language statements 101 correspond to the software system requirement defined by the user story 102. The process language statements 101 may include, for example, business process statements, such as BPEL or BPMN statements. The process language statements 101 may be in a business process management (BPM) compliant format. The process language statements 101 may be outputted. For example, BPEL statements or BPMN statements may be outputted as a corresponding file. The process language statements 101 may be used as an input to one or more tools, such as a process engine 110.

The system 100 allows for users to specify requirements using standardized templates, and for the process language statements 101 to be automatically generated based on user input. Since the generated process language statements 101 include key pieces of the user-entered user story 102, the user may review, comment on, and verify the business process language statements 101. Without automatic generation of the process language statements 101, a separate modeling tool may be necessary, which may require that business analysts or other personnel learn the separate modeling tool which may include learning a different language or modeling notation. With automatic generation of the process language statements 101, business analysts, developers, and the user may communicate using a common language.

Figure 2:
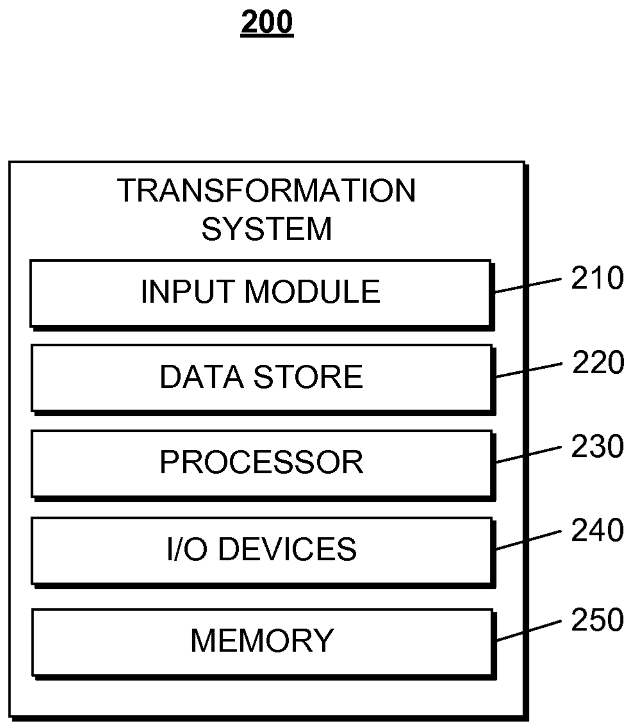

FIG. 2 illustrates an exemplary transformation system 200 for transforming a user story into process language statements. The system 200 includes an input module 210, a data store 220, one or more processors 230, one or more I/O (Input/Output) devices 240, and memory 250. The input module 220 may be used to input any type of information related to transforming a user story on the system 200. For example, the input module 210 may be used to input one or more user stories, to receive selection of a file that includes one or more previously inputted user stories, or to receive input of one or more customized parameters. In some implementations, data from the input module 210 is stored in the data store 220. The data included in the data store 220 may include, for example, one or more user stories, and one or more files that include process language statements generated based on one or more user stories.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

As mentioned above, BPEL process language statements may be defined based on key pieces of a user story, where the user story may be an agile user story. FIG. 3 is a table 300 which illustrates mappings between an agile methodology and BPEL. An agile methodology may use user stories to gather requirements, while BPEL supports abstract processes. Both a user story and an abstract process are high level descriptions of processing. Both a user story and an abstract process are not concerned with implementation details. A user story in an agile methodology may represent a high-level business use case, while BPEL may be used to document a high-level business requirement. Although implementations described in this disclosure reference BPEL, the techniques described throughout this disclosure are not limited to BPEL and the transformation framework may be extended to formats other than BPEL (e.g., BPMN or other suitable formats). In addition, the framework (and techniques described throughout this disclosure) may be extended to industry-specific formats, such as IFX (Interactive Financial Exchange), SWIFT (Society for Worldwide Interbank Financial Telecommunication), EDIFACT (Electronic Data Interchange For Administration, Commerce and Transport) for the financial industry, and other comparable industry-specific formats.

A user story may include and may rely upon sub-stories within the user story, while BPEL supports a business process invoking a service. Use of a sub-story and use of a service are each examples of modularization. An agile user story involves actors, actions, and achievements. BPEL supports a similar notion of roles. Both an agile methodology and BPEL are data-driven and implementation agnostic (e.g., both are not committed to any particular implementation).

Figure 4:
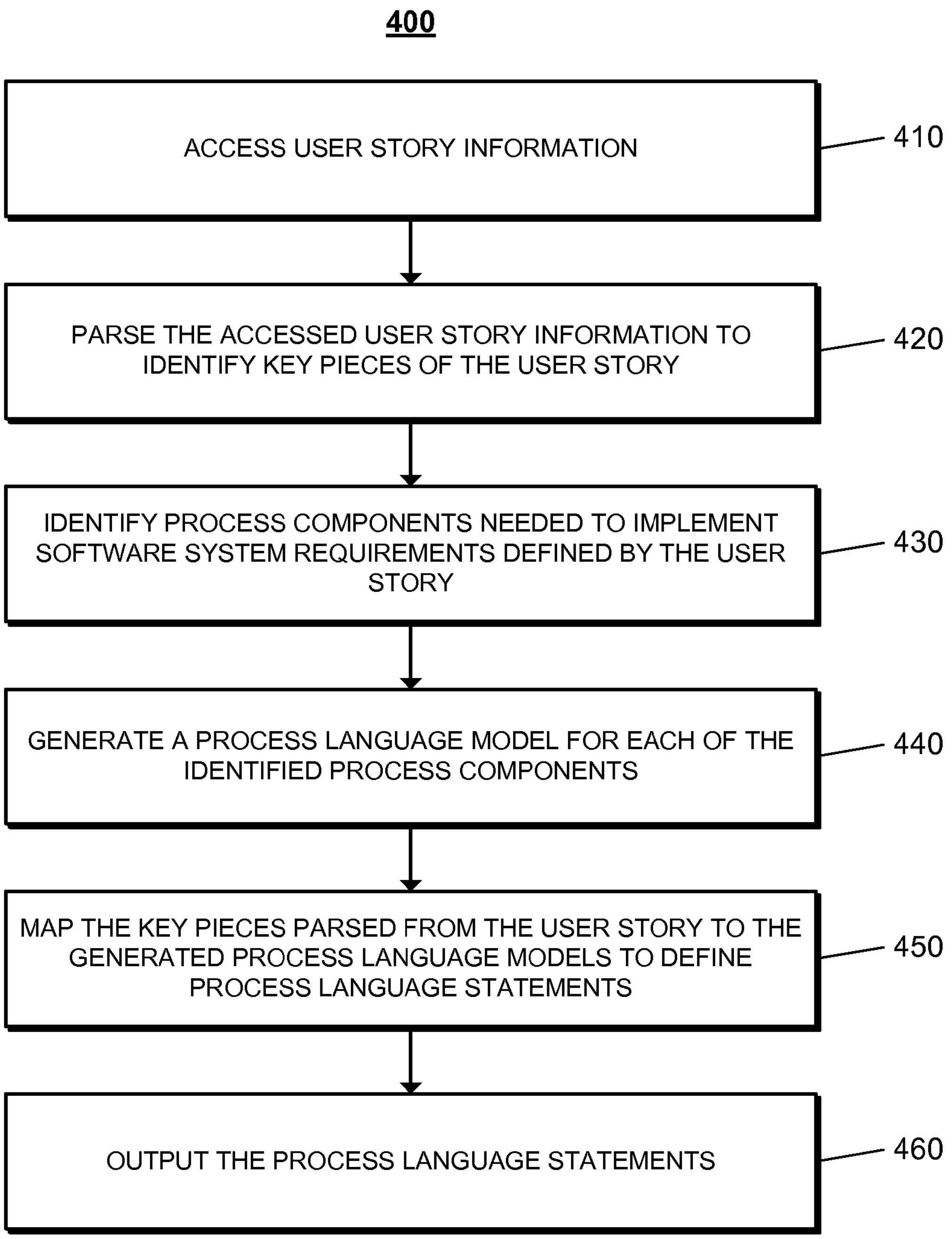
FIGS. 4 and 10 are flowcharts of exemplary processes.

FIG. 4 illustrates a process 400 for transforming a user story into process language statements. The operations of the process 400 are described generally as being performed by the system 100. In some implementations, operations of the process 400 may be performed by one or more processors included in one or more electronic devices.

The system 100 accesses user story information (410). User story information, which may be related to an agile user story, may be accessed, for example, from a file or a database or from one or more user interface controls. In some implementations, user story information is inputted by a user into a pre-defined template. A template may include a structured user story with one or more user input areas that serve as placeholders for user input where the user input completes the user story.

For example and as illustrated in FIG. 5A, a template 500 includes an input area 502 designed to receive a role, input areas 504 designed to receive one or more activities, and an input area 506 designed to receive an end goal. The user story information inputted using the template 500 specifies that when a user is acting in a particular role while using a software system, the user may perform the specified activities to achieve the specified end goal.

The template 500 does not indicate, however, whether the activities specified using the template 500 are to be performed in a particular order. FIG. 5B illustrates a template 510 which includes a role input area 512, one or more activity input areas 514, and an end goal input area 516 which are similar to the input areas 502, 504, and 506 described above with respect to FIG. 5A. A "one after another" phrase 517 indicates that the activities entered using the activity input areas 514 are to be performed in the order shown (e.g., activity one, followed by activity two, followed by activity three, etc.).

FIG. 5C illustrates an example template 520 that includes a role input area 522, one or more activity input areas 524, and an end goal input area 526, which are similar to the input areas 502, 504, and 506 described above with respect to FIG. 5A. The template 520 also includes an input area 528 designed to receive a number of attempts and an input area 530 designed to receive a failure handling action. The user story information inputted using the template 520 specifies that the user desires to retry the specified actions until they are successful up to the specified number of times. If an error occurs while the user performs an action, or, as another example, if the user has attempted the actions unsuccessfully the specified number of times, the specified failure handling action should be performed. FIG. 5D illustrates an example template 540 that is similar to the template 520 in that the template 540 supports repetition of a set of actions, however the template 540 does not include a failure handling action.

FIG. 5E illustrate a template 560 that includes a role input area 562 and an end goal input area 563. The user story information entered using the template 560 specifies that the user, while taking on the role specified by the role input area 562, may achieve the end goal specified by the end goal input area 563, by performing a set of activities, where each activity is performed if an associated condition is true. For example, the user may perform an activity 564 if a condition 566 is true.

Figure 6A:
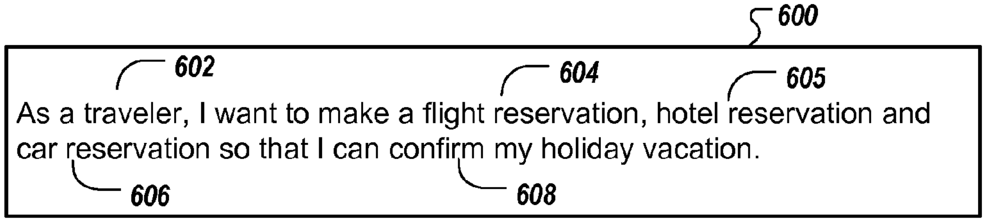
FIGS. 6A-6C are diagrams illustrating exemplary user story information.

The user, when presented with a template such as the template 500, 510, 520, 540, or 560, may supply user input for each of the input areas included in the template. For example, FIG. 6A illustrates user story information 600 entered using the template 500 illustrated in FIG. 5A. The user has specified a role 602 of traveler, activities 604, 605, and 606 of making a flight reservation, making a hotel reservation, and making a car reservation, respectively, and an end goal 608 of confirming the user's holiday vacation.

Figure 6B:
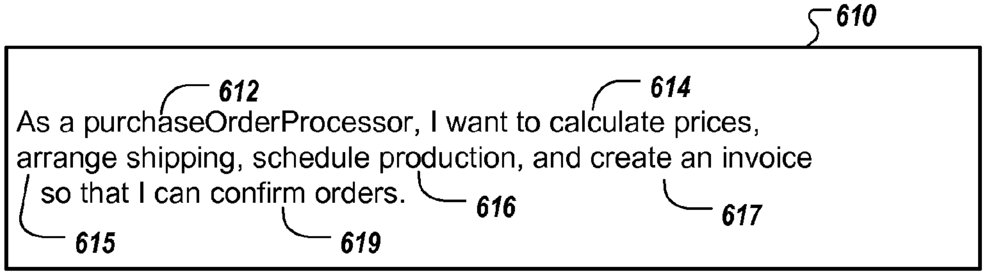
Figure 6C:
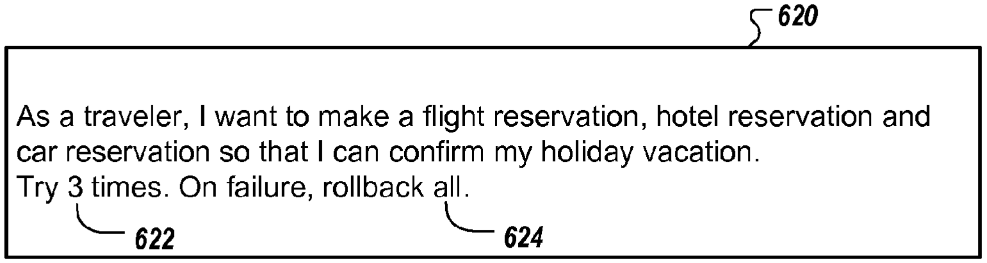

As another example, FIG. 6B illustrates user story information 610 indicating that the user specified a role 612 of purchase order processor, activities 614, 615, 616, and 617 of calculating prices, arranging shipping, scheduling production, and creating an invoice, respectively, and an end goal 619 of confirming an order. FIG. 6C illustrates user story information 620 entered using the template 520 illustrated in FIG. 5B. The user story information 620 includes the same role, activity, and end goal information as the user story information 600, but also includes a retry count 622 of three and a failure handling action 624 of rolling back all uncommitted operations.

Returning to FIG. 4, the system 100 parses the accessed user story information to identify key pieces of the user story (420). The user story information may be parsed using regular expressions. The user story information may be parsed to identify, for example, a role, one or more activities, an end goal, a number of attempts value, and a failure handling action. For example, referring to FIG. 6A, the user information 600 may be parsed to identify the role 602, the activities 604, 605, and 606, and the end goal 608. As another example and referring to FIG. 6C, the user story information 620 may be parsed to identify the retry count 622 and the failure handling action 624.

The system 100 identifies process components needed to implement software system requirements defined by the user story based on the key pieces of the user story (430). For example, the system 100 may identify one or more business process components, such as one or more BPEL components or one or more BPMN components. If BPEL components are identified, a process component, one or more partnerlinks components, a receive process component, an invoke process component, a throw process component, a variables component, and a loop process component may be identified.

The system 100 generates a process language model for each of the identified process components (440). For example, the system 100 may generate a business process language model for each of the identified business process components, such as generating a BPEL model for each identified BPEL component and a BPMN model for each identified BPMN component. For example, if BPEL components are identified, a process language model may be generated for the identified process component, the identified one or more partnerlinks components, the identified receive process component, the identified invoke process component, the identified throw process component, the identified variables component, and the identified loop process component.

The system 100 maps the key pieces parsed from the user story to the generated process language models to define process language statements (450). The process language statements may be, for example, business process language statements such as BPEL or BPMN that are in a business process management compliant format. For example, if the generated process language models are BPEL or BPMN process language models, the system 100 may map the key pieces parsed from the user story to the generated BPEL models to define BPEL statements or BPMN statements, respectively, that correspond to the software system requirement defined by the user story.

Figure 7:
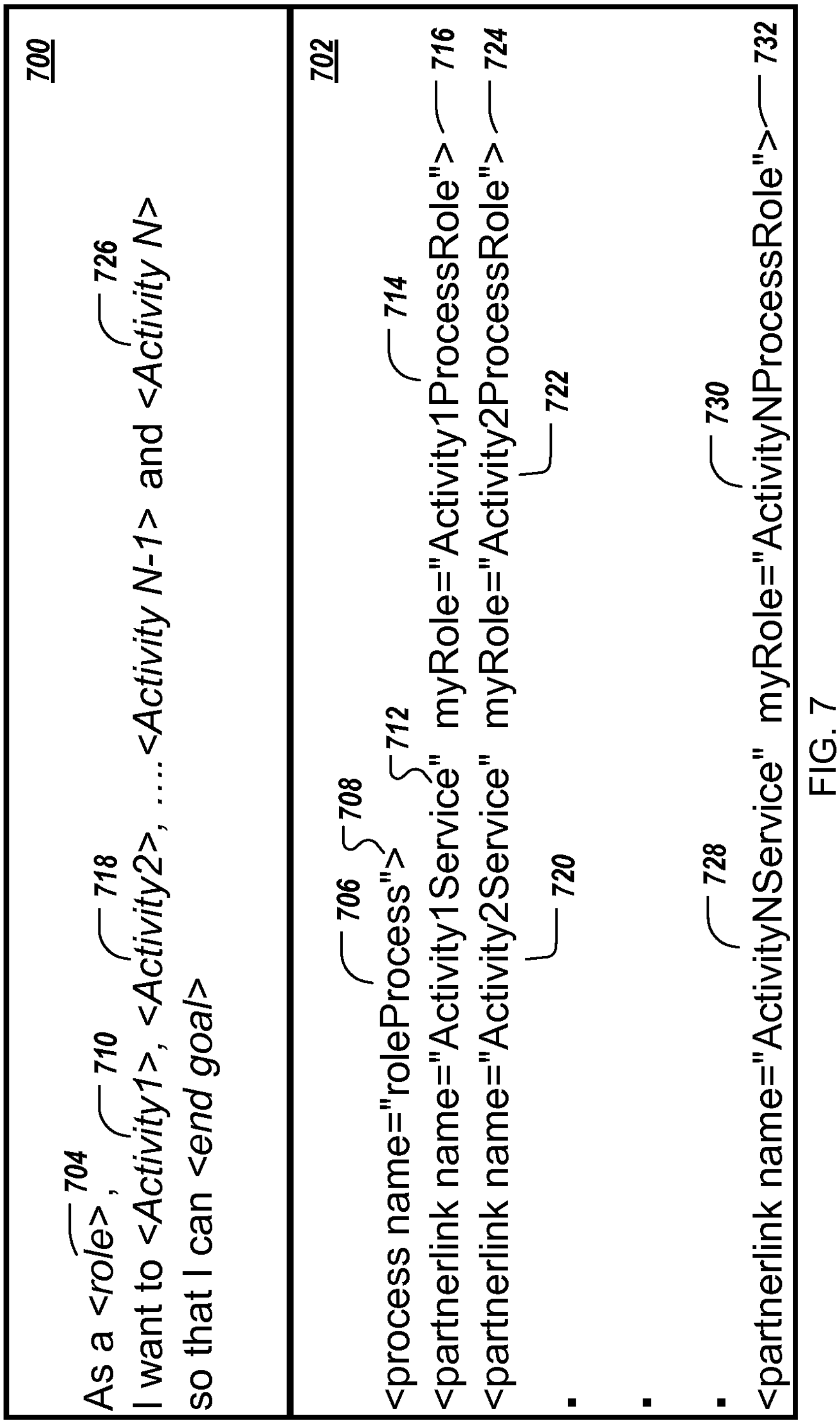

For example and as illustrated in FIG. 7, the system 100 may map key pieces parsed from a user story 700 to generated BPEL process language models to define BPEL process language statements 702. For example, a role 704 parsed from the user story 700 may be mapped to a name attribute 706 of a process element 708 included in the BPEL process language statements 702. The process element 708 represents a BPEL process.

As another example, an activity 710 parsed from the user story 700 may be mapped to a name attribute 712 and to a role attribute 714 of a partnerlink element 716. The partnerlink element 716 represents an entity that the BPEL process interacts with, such as a web service. The role attribute 714 specifies the role that the BPEL process has in the interaction represented by the partnerlink element 716. Similar to the activity 710, an activity 718 parsed from the user story 700 may be mapped to a name attribute 720 and to a role attribute 722 of a partnerlink element 724 and an activity 726 parsed from the user story 700 may be mapped to a name attribute 728 and to a role attribute 730 of a partnerlink element 732.

As a more detailed example and as illustrated in FIG. 8, key pieces from a user story 800 may be mapped to one or more of process language statements 802, 804, and 806. The user story 800 is the same user story as the user story 610 described above with respect to FIG. 6B. The role 612 may be mapped to a name attribute 808 of a process element 810 included in the process language statements 802. The role 612 may also be mapped to a partnerlink attribute 812 of a receive element 814 included in the process language statements 806. The receive element 814 may represent a request from the user to perform the process represented by the process element 810. The end goal 619 may be mapped to an operation attribute 816 of the receive element 814.

The activity 614 may be mapped to a role attribute 818 and to a name attribute 820 of a partnerlink element 822 that is included in a partnerlinks element 824 as part of the process language statements 804. Similarly, the activity 615 may be mapped to a role attribute 826 and to a name attribute 828 of a partnerlink element 830, the activity 616 may be mapped to a role attribute 832 and to a name attribute 834 of a partnerlink element 836, and the activity 617 may be mapped to a role attribute 838 and to a name attribute 840 of a partnerlink element 842.

As another example and as illustrated in FIGS. 9A and 9B, key pieces of a user story 900 may be mapped to one or more of process language statements 902, 904, 906, 908, 910, 912, and 914. The user story 900 is the same user story as the user story 620 described above with respect to FIG. 6C. The user story 900 includes a role 916, activities 918, 920, and 922, an end goal 924, a retry count 926, and a failure handling option 928.

The role 916 may be mapped to a name attribute 930 of a process element 932 included in the process language statements 902. The activity 918 may be mapped to a name attribute 934 and to a role attribute 935 of a partnerlink element 936 included in a partnerlinks element 938 included in the process language statements 904. The activity 920 may be mapped to a name attribute 940 and to a role attribute 941 of a partnerlink element 942. The activity 922 may be mapped to a name attribute 944 and to a role attribute 945 of a partnerlink element 946.

The activity 918 may also be mapped to portions of an invoke element 950, a receive element 952, a throw element 954, and a variables element 956. The invoke element 950 represents invocation of a web service associated with the activity 918. The receive element 952 represents a request from the user to perform the process represented by the process element 920. The throw element 954 is used for error handling. The variables element 956 represents variables that are used in the process represented by the process element 932.

The activity 918 is mapped to a partnerlink attribute 960, a port type attribute 962, an operation attribute 964, an input variable attribute 966, an output variable attribute 968, and a documentation sub element 970 of the invoke element 950. The activity 918 is mapped to a port type attribute 972 and to a operation attribute 974 of the receive element 952. Based on the inclusion of the fault handling option 928 included in the user story 900, the input variable element 966 is mapped to a fault variable attribute 976 of a catch sub element 978 included in the invoke element 950 and to a fault variable attribute 980 of the throw element 954. The input variable element 966 is also mapped to a variable sub element 982 included in the variables element 956.

The retry count 926 is mapped to a value 990 included in a condition element 992. The condition element 992 may be used to control an iteration count of a while element 994. The activities 920 and 922 may also be mapped in a manner similar to the mapping of the activity 918, but for sake of brevity, some of the mappings for the activity 920 and 922 are not shown in FIGS. 9A and 9B.

Returning to FIG. 4, the system 100 outputs the process language statements (460). For example, business process statements, such as BPEL or BPMN statements, may be outputted. The process language statements may be outputted, for example, to a file, to a database, to a display device, to a printer, or to some other output device. The process language statements may be directly output to a process engine.

Figure 10:
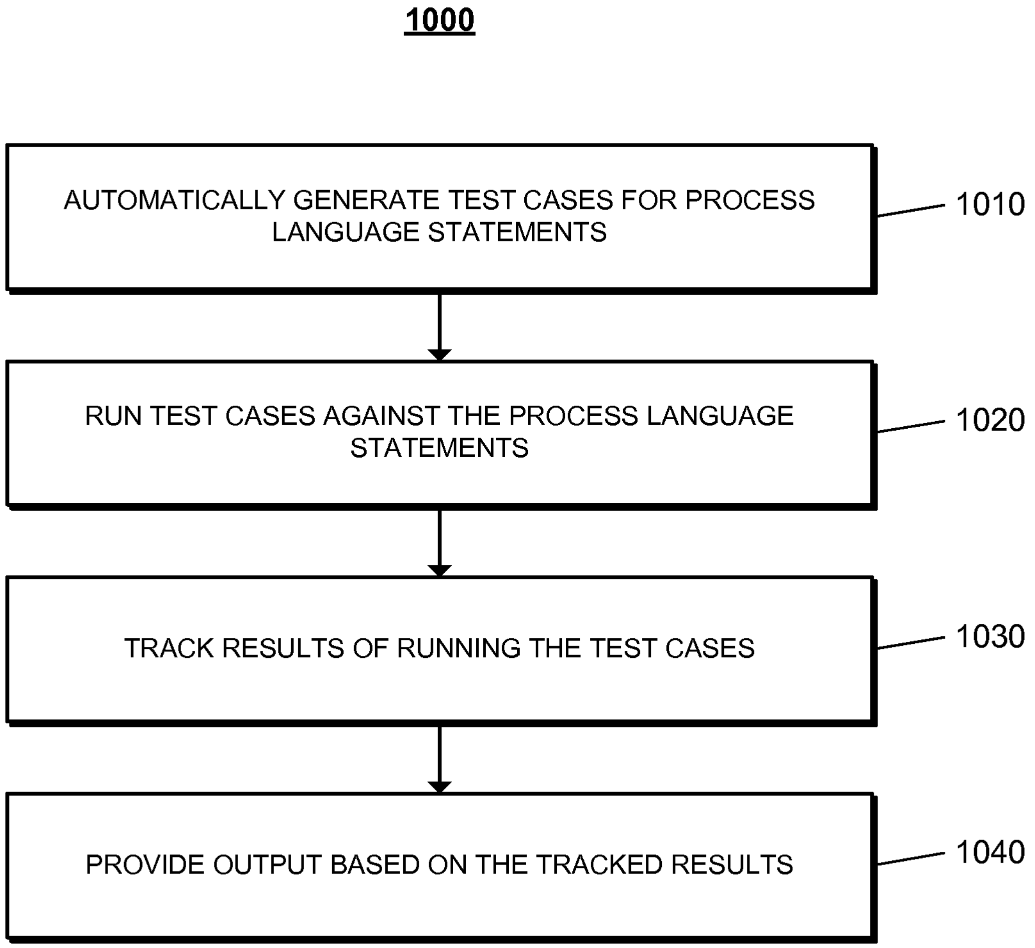

FIG. 10 illustrates a process 1000 for testing process language statements. The operations of the process 1000 are described generally as being performed by the system 100. In some implementations, operations of the process 1000 may be performed by one or more processors included in one or more electronic devices.

The system 100 automatically generates test cases for process language statements (1010). A test case may be used, for example, for developers and users to verify that the process language statements correctly implement a requirement represented by a user story. A test case may include, for example, code to invoke one or more operations included in the process language statements. Each test case may include a definition of an expected output of the test case.

The system 100 runs test cases against the process language statements (1020). For example, one or more operations included in the process language statements may be performed based on running the test cases.

The system 100 tracks results of running the test cases (1030). For example, the system 100 may compare, for each test case, an actual output of the test case to the expected output of the test case. If the actual output matches the expected output, an indication of success may be recorded. If the actual output does not match the expected output, the actual output and an indication of test case failure may be recorded.

The system 100 provides output based on the tracked results (1040). For example, tracked information recorded from running the test cases may be saved to a file, displayed on a display device, included in one or more reports, or sent to a printer or to some other output device.

Figure 11:
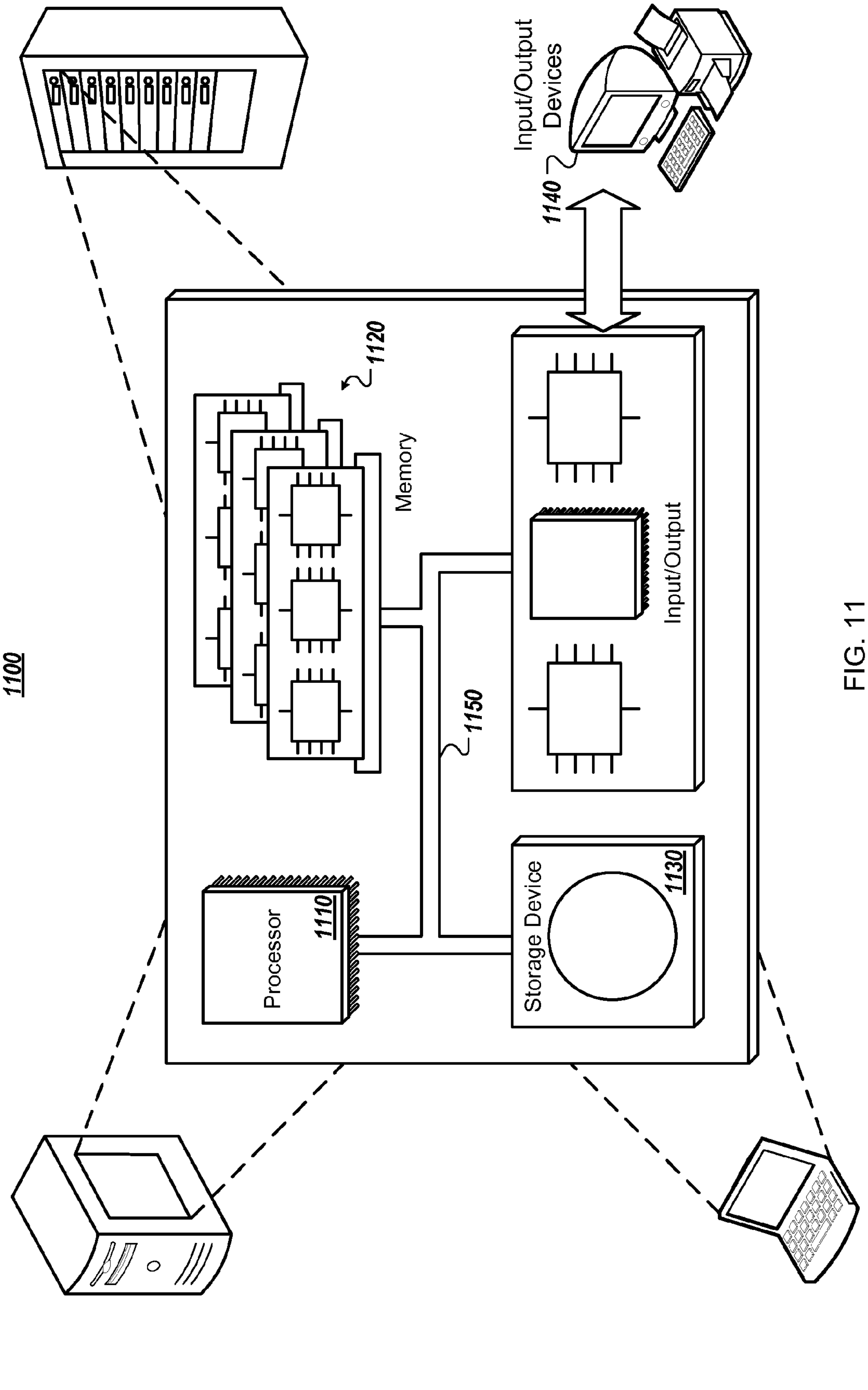

FIG. 11 is a schematic diagram of an example of a generic computer system 1100. The system 1100 can be used for the operations described in association with the processes 400 and 1000, according to one implementation. For example, the system 1100 may be included in the system 200.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising:

at least one processor; and at least one memory coupled to the at least one processor having stored thereon instructions which, when executed by the at least one processor, causes the at least one processor to perform operations comprising:

accessing user story information that was inputted by a user into a pre-defined template designed to receive a user story, the pre-defined template being structured to include a role input area, one or more activity input areas, and an end goal input area and the user story being a software system requirement formulated as one or more sentences that include a role in the role input area, one or more activities in the one or more activity input areas, and an end goal in the end goal input area;

parsing the accessed user story information inputted by the user into the pre-defined template to identify key pieces of the user story;

based on the key pieces of the user story parsed from the user story information inputted by the user into the pre-defined template, identifying process components needed to implement the software system requirement defined by the user story;

generating a process language model for each of the identified process components;

mapping the key pieces parsed from the user story to the generated process language models to define process language statements that correspond to the software system requirement defined by the user story; and outputting the process language statements.

2. The system of claim 1:

wherein accessing user story information that was inputted by a user into a pre-defined template designed to receive a user story comprises accessing agile user story information that was inputted by a user into a pre-defined template designed to receive an agile user story;

wherein parsing the accessed user story information inputted by the user into the pre-defined template to identify key pieces of the user story comprises parsing the accessed agile user story information inputted by the user into the pre-defined template to identify key pieces of the agile user story;

wherein identifying process components needed to implement the software system requirement defined by the user story comprises identifying process components needed to implement the software system requirement defined by the agile user story; and wherein mapping the key pieces parsed from the user story to the generated process language models to define process language statements that correspond to the software system requirement defined by the user story comprises mapping the key pieces parsed from the agile user story to the generated process language models to define process language statements that correspond to the software system requirement defined by the agile user story.

3. The system of claim 1:

wherein identifying process components needed to implement the software system requirement defined by the user story comprises identifying business process components needed to implement the software system requirement defined by the user story;

wherein generating a process language model for each of the identified process components comprises generating a business process language model for each of the identified business process components;

wherein mapping the key pieces parsed from the user story to the generated process language models to define process language statements that correspond to the software system requirement defined by the user story comprises mapping the key pieces parsed from the user story to the generated business process language models to define business process language statements that correspond to the software system requirement defined by the user story; and wherein outputting the process language statements comprises outputting the business process language statements.

4. The system of claim 3:

wherein identifying business process components needed to implement the software system requirement defined by the user story comprises identifying business process execution language (BPEL) components needed to implement the software system requirement defined by the user story;

wherein generating a business process language model for each of the identified business process components comprises generating a BPEL model for each of the identified BPEL components;

wherein mapping the key pieces parsed from the user story to the generated business process language models to define business process language statements that correspond to the software system requirement defined by the user story comprises mapping the key pieces parsed from the user story to the generated BPEL models to define BPEL statements that correspond to the software system requirement defined by the user story; and wherein outputting the business process language statements comprises outputting the BPEL statements.

5. The system of claim 3:

wherein identifying business process components needed to implement the software system requirement defined by the user story comprises identifying business process modeling notation (BPMN) components needed to implement the software system requirement defined by the user story;

wherein generating a business process language model for each of the identified business process components comprises generating a BPMN model for each of the identified BPMN components;

wherein mapping the key pieces parsed from the user story to the generated business process language models to define business process language statements that correspond to the software system requirement defined by the user story comprises mapping the key pieces parsed from the user story to the generated BPMN models to define BPMN statements that correspond to the software system requirement defined by the user story; and wherein outputting the business process language statements comprises outputting the BPMN statements.

6. The system of claim 3, wherein mapping the key pieces parsed from the user story to the generated business process language models to define business process language statements that correspond to the software system requirement defined by the user story comprises defining business process language statements that are in a business process management compliant format.

7. The system of claim 1:

wherein parsing the accessed user story information inputted by the user into the pre-defined template to identify key pieces of the user story comprises parsing the accessed user story information inputted by the user into the pre-defined template to identify the role and the one or more activities.

8. The system of claim 7:

wherein identifying process components needed to implement the software system requirement defined by the user story comprises identifying a process needed to implement the software system requirement defined by the user story;

wherein generating a process language model for each of the identified process components comprises generating a process language model for the identified process; and wherein mapping the key pieces parsed from the user story to the generated process language models to define process language statements that correspond to the software system requirement defined by the user story comprises mapping the role parsed from the user story to the generated process language model for the identified process.

9. The system of claim 7:

wherein identifying process components needed to implement the software system requirement defined by the user story comprises identifying one or more partnerlinks needed to implement the software system requirement defined by the user story;

wherein generating a process language model for each of the identified process components comprises generating a process language model for the identified one or more partnerlinks; and wherein mapping the key pieces parsed from the user story to the generated process language models to define process language statements that correspond to the software system requirement defined by the user story comprises mapping the one or more activities parsed from the user story to the generated process language model for the identified one or more partnerlinks.

10. The system of claim 7:

wherein identifying process components needed to implement the software system requirement defined by the user story comprises identifying a receive process component needed to implement the software system requirement defined by the user story; and wherein generating a process language model for each of the identified process components comprises generating a process language model for the identified receive process component.

11. The system of claim 7:

wherein accessing user story information that was inputted by a user into a pre-defined template comprises accessing user story information that was inputted by a user into a pre-defined template that includes a number of attempts input area designed to receive a number of attempts and a failure handling action input area designed to receive a failure handling action; and wherein parsing the accessed user story information inputted by the user into the pre-defined template to identify key pieces of the user story comprises parsing the accessed user story information inputted by the user into the pre-defined template to identify the number of attempts and the failure handling action.

12. The system of claim 11:

wherein identifying process components needed to implement the software system requirement defined by the user story comprises identifying an invoke process component needed to implement the software system requirement defined by the user story;

wherein generating a process language model for each of the identified process components comprises generating a process language model for the identified invoke process component; and wherein mapping the key pieces parsed from the user story to the generated process language models to define process language statements that correspond to the software system requirement defined by the user story comprises mapping the one or more activities parsed from the user story to the generated process language model for the identified invoke process component.

13. The system of claim 11:

wherein identifying process components needed to implement the software system requirement defined by the user story comprises identifying a throw process component needed to implement the software system requirement defined by the user story;

wherein generating a process language model for each of the identified process components comprises generating a process language model for the identified throw process component; and wherein mapping the key pieces parsed from the user story to the generated process language models to define process language statements that correspond to the software system requirement defined by the user story comprises mapping the one or more activities parsed from the user story to the generated process language model for the identified throw process component.

14. The system of claim 11:

wherein identifying process components needed to implement the software system requirement defined by the user story comprises identifying variables needed to implement the software system requirement defined by the user story;

wherein generating a process language model for each of the identified process components comprises generating a process language model for the identified variables; and wherein mapping the key pieces parsed from the user story to the generated process language models to define process language statements that correspond to the software system requirement defined by the user story comprises mapping the one or more activities parsed from the user story to the generated process language model for the identified variables.

15. The system of claim 11:

wherein identifying process components needed to implement the software system requirement defined by the user story comprises identifying a loop process component needed to implement the software system requirement defined by the user story;

wherein generating a process language model for each of the identified process components comprises generating a process language model for the identified loop process component; and wherein mapping the key pieces parsed from the user story to the generated process language models to define process language statements that correspond to the software system requirement defined by the user story comprises mapping the number of attempts parsed from the user story to the generated process language model for the identified loop process component.

16. The system of claim 1, wherein the operations further comprise:

automatically, without human intervention, generating test cases for the process language statements;

running the automatically generated test cases against the process language statements;

tracking results of running the automatically generated test cases against the process language statements; and providing output based on the tracked results.

17. The system of claim 16, wherein providing output based on the tracked results comprises:

generating an error report based on the tracked results; and outputting the generated error report.

18. The system of claim 16, wherein providing output based on the tracked results comprises:

determining one or more suggested changes to the process language statements based on the tracked results; and outputting the one or more suggested changes.

19. A method comprising:

accessing, by at least one processor, user story information that was inputted by a user into a pre-defined template designed to receive a user story, the pre-defined template being structured to include a role input area, one or more activity input areas, and an end goal input area and the user story being a software system requirement formulated as one or more sentences that include a role in the role input area, one or more activities in the one or more activity input areas, and an end goal in the end goal input area;

parsing the accessed user story information inputted by the user into the pre-defined template to identify key pieces of the user story;

based on the key pieces of the user story parsed from the user story information inputted by the user into the pre-defined template, identifying process components needed to implement the software system requirement defined by the user story;

generating a process language model for each of the identified process components;

mapping, by at least one processor, the key pieces parsed from the user story to the generated process language models to define process language statements that correspond to the software system requirement defined by the user story; and outputting the process language statements.

20. At least one non-transitory computer-readable storage medium encoded with executable instructions that, when executed by at least one processor, cause the at least one processor to perform operations comprising:

accessing user story information that was inputted by a user into a pre-defined template designed to receive a user story, the pre-defined template being structured to include a role input area, one or more activity input areas, and an end goal input area and the user story being a software system requirement formulated as one or more sentences that include a role in the role input area, one or more activities in the one or more activity input areas, and an end goal in the end goal input area;

parsing the accessed user story information inputted by the user into the pre-defined template to identify key pieces of the user story;

based on the key pieces of the user story parsed from the user story information inputted by the user into the pre-defined template, identifying process components needed to implement the software system requirement defined by the user story;

generating a process language model for each of the identified process components;

mapping the key pieces parsed from the user story to the generated process language models to define process language statements that correspond to the software system requirement defined by the user story; and outputting the process language statements.

* * * * *